US 8,941,469 B1

(12) United States Patent
Diorio et al.

(10) Patent No.: US 8,941,469 B1
(45) Date of Patent: Jan. 27, 2015

(54) RFID TAG AUTHENTICATION WITH PUBLIC-KEY CRYPTOGRAPHY

(75) Inventors: Christopher J. Diorio, Shoreline, WA (US); Scott A. Cooper, Seattle, WA (US)

(73) Assignee: Impinj, Inc., Seattle, WA (US)

(*) Notice: Subject to any disclaimer, the term of this patent is extended or adjusted under 35 U.S.C. 154(b) by 904 days.

(21) Appl. No.: 13/155,057

(22) Filed: Jun. 7, 2011

Related U.S. Application Data

(60) Provisional application No. 61/354,661, filed on Jun. 14, 2010.

(51) Int. Cl.
*H04L 29/02* (2006.01)
*H04L 9/32* (2006.01)
*G05B 19/18* (2006.01)

(52) U.S. Cl.
USPC ....... 340/10.1; 340/10.2; 340/10.3; 340/10.4; 340/10.5

(58) Field of Classification Search
CPC .................................................. H04L 29/02
USPC ............. 340/10.1–10.5; 380/45, 25; 713/176, 713/180, 169; 705/76
See application file for complete search history.

(56) References Cited

U.S. PATENT DOCUMENTS

| | | | | |
|---|---|---|---|---|
| 5,144,667 A * | 9/1992 | Pogue et al. | ..................... | 380/45 |
| 6,058,477 A * | 5/2000 | Kusakabe et al. | ............. | 713/169 |
| 6,172,596 B1 * | 1/2001 | Cesar et al. | ................. | 340/10.41 |
| 6,647,493 B1 * | 11/2003 | Occhipinti et al. | ........... | 713/170 |
| 6,704,608 B1 * | 3/2004 | Azuma | ........................... | 700/66 |
| 7,774,605 B2 * | 8/2010 | Kanai et al. | .................... | 713/176 |
| 7,930,554 B2 * | 4/2011 | Coulier et al. | ................ | 713/184 |
| 8,174,367 B1 * | 5/2012 | Diorio | .......................... | 340/10.4 |
| 8,261,076 B2 * | 9/2012 | Abendroth et al. | ........... | 713/169 |
| 8,412,937 B2 * | 4/2013 | Maubach et al. | ............. | 713/168 |
| 2006/0235805 A1 * | 10/2006 | Peng et al. | ...................... | 705/76 |
| 2008/0170695 A1 * | 7/2008 | Adler et al. | ................... | 380/277 |
| 2012/0154111 A1 * | 6/2012 | Schattleitner et al. | ......... | 340/5.8 |

* cited by examiner

*Primary Examiner* — Nam V Nguyen
(74) *Attorney, Agent, or Firm* — Turk IP Law, LLC

(57) ABSTRACT

An authentication method includes RFID readers authenticating RFID tags using public-key cryptography. A tag manufacturer or other legitimate authority produces a tag private-public key pair and stores the tag private key in externally unreadable tag memory and the tag public key in externally readable tag memory. The authority produces a master private-public key pair and distributes the master public key to readers in the field. The authority generates a tag-specific electronic signature based on at least the tag public key and the master private key and stores this signature in externally readable tag memory. A reader authenticates the tag by retrieving the tag public key and electronic signature from the tag, verifying the authenticity of the tag public key using the master public key and the electronic signature, challenging the tag, receiving a response from the tag to the challenge, and verifying the response using the tag public key.

27 Claims, 14 Drawing Sheets

*RFID SYSTEM*

*RFID TAG*

*RFID READER SYSTEM CONFIGURATION WITH OPTIONAL LOCAL AND REMOTE COMPONENTS*

ARCHITECTURE OF INTERFACE CONVERTER WITH AGENT AND UTILITY

SAMPLE SCREENSHOT OF INTERFACE CONVERTER EXPOSING TO AGENT OPTIONS TO CONTROL FUNCTIONALITY OF TAG AUTHENTICATION UTILITY

RFID TAG AUTHENTICATION WITH PUBLIC-KEY CRYPTOGRAPHY

CROSS REFERENCE TO RELATED APPLICATIONS

This application claims the benefit of U.S. Provisional Patent Application Ser. No. 61/354,661 filed on Jun. 14, 2010. The disclosures of the provisional patent application are hereby incorporated by reference for all purposes.

BACKGROUND

Radio-Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on.

An RFID tag typically includes an antenna subsystem and a radio subsystem including a modem, a power management section, a logical section, and a memory. In some RFID tags the logical section may include a cryptographic algorithm which, in many instances, relies on one or more passwords or keys stored in tag memory. In some RFID tags the power management section may include an energy storage device such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

Counterfeiting is a problem in many areas of global commerce. For example, retail-goods manufacturers, such as manufacturers of luxury clothing or purses, often find counterfeit items in the marketplace. Many commercial enterprises envision using cryptographically secure RFID systems to ascertain whether a tagged item, or more particularly the tag attached to an item, is genuine and not counterfeit. However, these commercial applications are loathe to adopt anti-counterfeiting systems that require password or key distribution, because securely managing and distributing passwords or keys among global trading partners is difficult.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID readers authenticating RFID tags using asymmetric (public key) cryptography. A tag manufacturer or other legitimate entity generates a private-public tag key pair, writes the tag private key into a region of tag memory that is not readable by readers (i.e., not externally readable), and writes the tag public key into a region of tag memory that is readable by readers (i.e., externally readable). A tag manufacturer or other legitimate entity (such as a signing authority and hereafter denoted as a signing authority) generates a master private-public key pair, stores the master private key in a secure location, and distributes the master public key to readers in the field.

According to embodiments, the signing authority generates a tag-specific electronic signature by signing and/or encrypting at least the tag public key with the master private key, and stores the electronic signature into a region of tag memory that is readable by readers (i.e., externally readable). A reader in the field may then subsequently authenticate the tag without network access and without any stored keys except the single master public key, as described below.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

Figure 1:
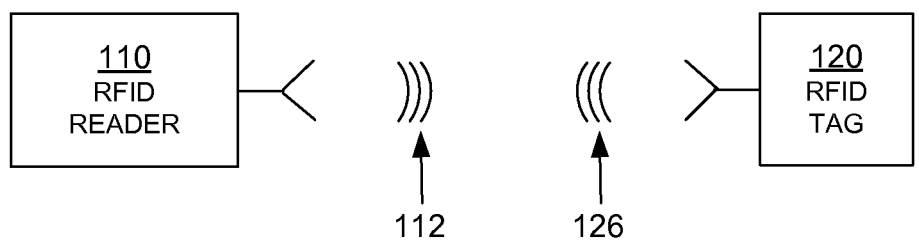
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In some applications, RFID systems are called upon to ensure the authenticity of an item to which a tag is attached. In these systems a reader challenges the tag and asks the tag to "prove" that it is genuine and not counterfeit. If the tag is genuine, then the item to which it is attached is presumed also to be genuine, especially if the tag is embedded into or onto the item and is difficult to alter or remove. In this case the task of preventing an item from being counterfeited essentially becomes a task of preventing the tag that is attached to the item from being counterfeited.

Preventing a tag from itself being counterfeited is difficult. For example, one way in which a tag can be counterfeited is by using a replay attack. In a replay attack, a counterfeiter listens to the communications between a reader and a legitimate tag and creates a counterfeit tag that mimics or "clones" the legitimate tag's response. To prevent such cloning, each time a reader challenges a tag both the reader and the tag should send different and unpredictable (at least unpredictable by the counterfeiter) messages. Typical cryptographic systems provide such unpredictability by having the reader send a different random challenge to the tag for each authentication, and having the tag generate a different response for each random challenge. In many systems the tag also adds some of its own randomness to the challenge so as to further confound replay attacks. Many challenge-response methods are known and applicable to this use case. Some challenge-response methods use what are known as symmetric cryptographic algorithms, such as the Advanced Encryption Standard (AES). Others use what are known as asymmetric or public key cryptographic algorithms, such as the Rivest/Shamir/Adleman (RSA) algorithm.

Regardless of whether an RFID system uses a symmetric or an asymmetric cryptographic algorithm, each tag contains a stored secret, also known as a secret key, a private key, or sometimes just a key. Symmetric algorithms typically denote the stored secret as a "secret key". Asymmetric algorithms typically denote the stored secret as a "private key". For symmetric algorithms, the secret key is known to the interrogating reader but not to a counterfeiter. For asymmetric algorithms, only the tag knows its private key, but the tag discloses a public key which is freely available to readers and to potential counterfeiters alike. In either case, to authenticate a tag the reader sends a random challenge; the tag uses its cryptographic algorithm to compute a response from the challenge and its stored secret; the tag sends the response to the reader; and the reader verifies the response by decrypting it using the tag's secret key (symmetric algorithm) or public key (asymmetric algorithm). Of course, if all tags contained the same stored secret then the system would not be particularly secure, because if a counterfeiter managed to reverse-engineer a single tag and uncover the stored secret, then he knows the stored secret for all tags. To remedy this problem, RFID systems may use a multitude of stored secrets, ideally allocating a unique stored secret for each and every tag.

This approach appears simple and secure, but is problematic from a commercial standpoint. RFID tag vendors already sell billions of tags per year, and will sell tens of billions of tags per year in the very near future. With this massive proliferation of tags there will be a consequent proliferation of stored secrets and public keys, and no reader can possibly hope to store all keys for all tags. Worse, for a symmetric algorithm, suppose that a single reader did store all the secret keys. In this latter case a counterfeiter merely has to steal a single reader and "break" it to know all the secret keys for potentially billions of tags. For these reasons, a particular reader cannot or should not know every tag's secret key or public key, and without knowing a tag's secret or public key the reader cannot authenticate the tag. Of course, a network database could store the keys, and the reader could ask the database for the key every time it sees a new tag, but encumbering every tag authentication with a network access may be slow and, if the network is temporarily unavailable, unreliable.

One possible alternative for systems using asymmetric cryptographic algorithms is for the tag to store both the private and public key, and to divulge its public key upon interrogation by a reader. However, this solution is flawed, because a counterfeiter could then simply create counterfeit tags with legitimate private/public key pairs and readers will not be able to distinguish them from legitimate tags.

Described herein is a tag authentication algorithm that addresses the above issues by allowing each tag to store a unique secret while not requiring a reader to store a large number of keys. Moreover, this algorithm does not require a reader to access a network for each tag authentication.

In a first step of the authentication, the reader interrogates the tag and retrieves the tag's public key and electronic signature. In the second step, the reader uses the master public key and the asymmetric algorithm to verify the electronic signature and thereby ensure that tag's public key was signed by the signing authority.

A reader determining that a tag's electronic signature is legitimate does not necessarily mean that the tag is genuine—indeed, a counterfeiter could have read a tag public key and an electronic signature from a legitimate tag and copied them into a cloned tag. What a legitimate signature does say is that the tag public key is genuine. To verify that the tag is itself genuine, in the third step the reader challenges the tag with a random challenge and the tag replies with a tag response encrypted using the tag's private key. In the fourth and final step the reader decrypts the tag's response using the tag's public key. If the response decrypts correctly then the reader can be certain that the tag is genuine, because the reader knows from step two that the tag's public key was genuine, and only an authentic tag can know the tag private key that corresponds to the tag public key. These third and fourth steps address the issue of a counterfeiter copying an authentic tag's public key into a counterfeit tag, because the counterfeiter cannot know the authentic tag's private key and so cannot likewise copy the tag's private key into the counterfeit tag. Without the tag's private key, the counterfeit tag cannot form a response to a challenge that will decrypt correctly using the tag's public key.

In embodiments as described herein every tag can have a unique private-public key pair but the reader only needs to store a single master public key. Of course, actual system implementations may choose to use more than one master private-public key pair, so that if one master key pair is compromised then not all tags are compromised, but the number of master key pairs can be much smaller than the number of tags deployed in the field. Finally, the reader is able to verify tag authenticity without needing access to any secret or to a network.

FIG. 1 is a diagram of components of a typical RFID system 100, incorporating embodiments. An RFID reader 110 transmits an interrogating radio frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

RFID tag 120 can be a passive tag, or an active or battery-assisted tag (i.e., having its own power source). Where RFID tag 120 is a passive tag, it is powered from wave 112.

Figure 2:
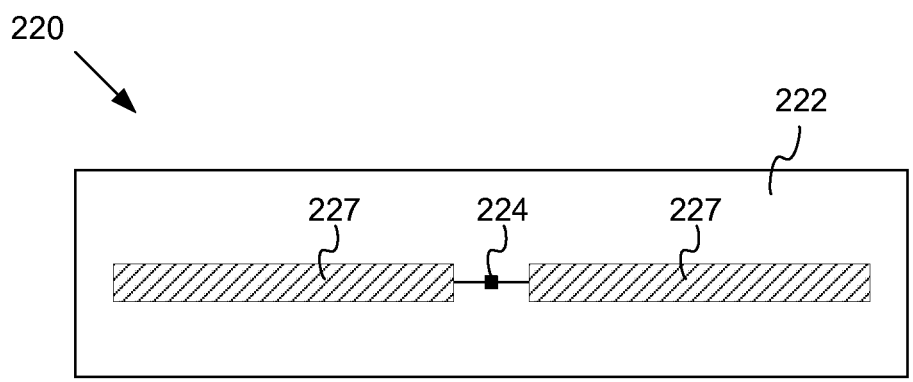
FIG. 2 is a diagram showing components of a passive RFID tag, such as a tag that can be used in the system of FIG. 1.

FIG. 2 is a diagram of an RFID tag 220, which can be the same as RFID tag 120 of FIG. 1. RFID tag 220 is implemented as a passive tag, meaning it does not have its own power source. Much of what is described in this document, however, applies also to active and battery-assisted tags.

RFID tag 220 is formed on a substantially planar inlay 222, which can be made in many ways known in the art. RFID tag 220 includes an electrical circuit which is preferably implemented as an IC 224. IC 224 is arranged on inlay 222.

RFID tag 220 also includes an antenna for exchanging wireless signals with its environment. The antenna is usually flat and attached to inlay 222. IC 224 is electrically coupled to the antenna via suitable antenna terminals (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
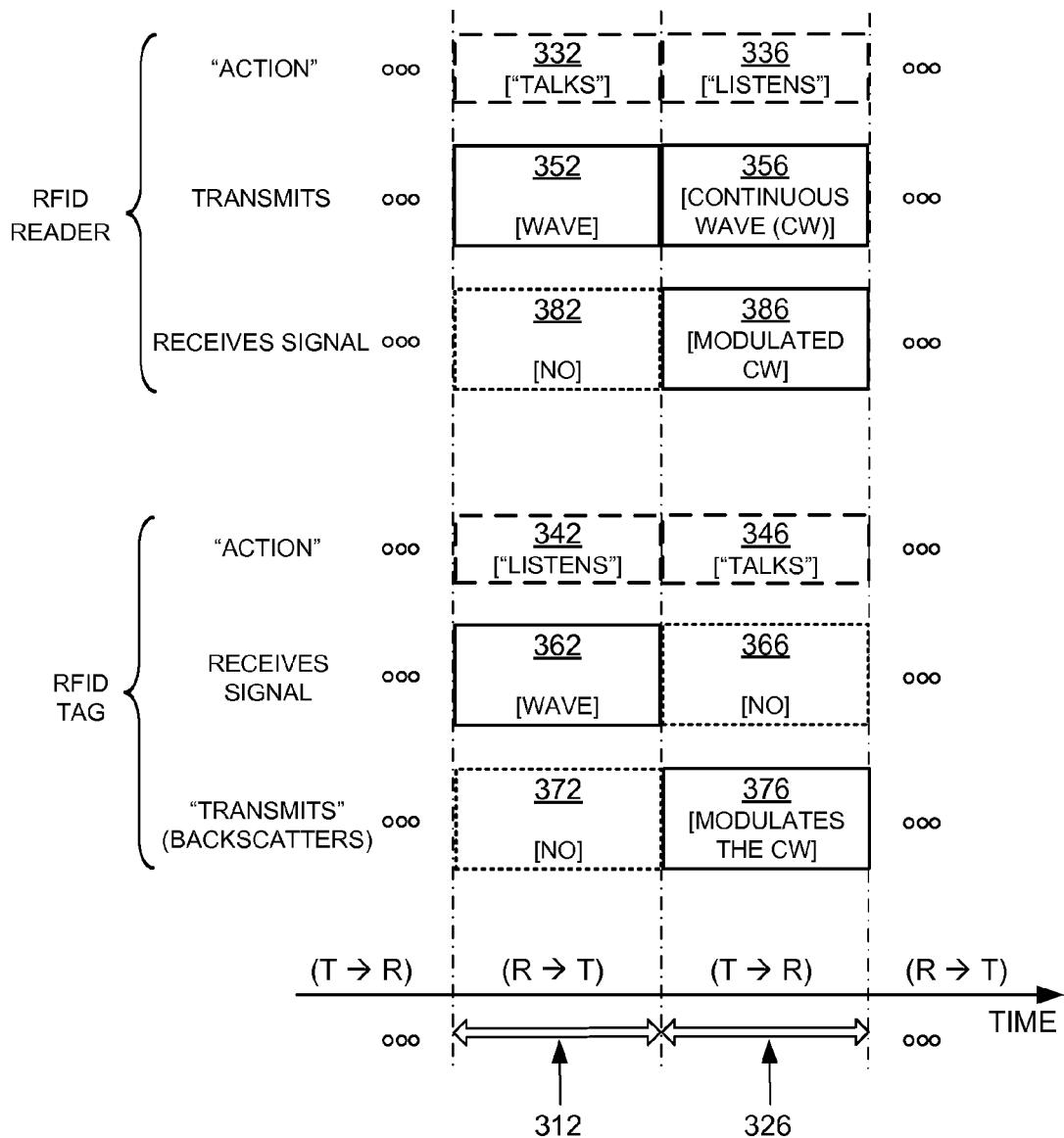
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when RFID reader 110 talks to RFID tag 120 the communication session is designated as "R→T", and when RFID tag 120 talks to RFID reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while RFID reader 110 talks (during interval 312), and talks while RFID reader 110 listens (during interval 326).

In terms of actual technical behavior, during interval 312, RFID reader 110 talks to RFID tag 120 as follows. According to block 352, RFID reader 110 transmits wave 112, which was first described in FIG. 1. At the same time, according to block 362, RFID tag 120 receives wave 112 and processes it, to extract data and so on. Meanwhile, according to block 372, RFID tag 120 does not backscatter with its antenna, and according to block 382, RFID reader 110 has no wave to receive from RFID tag 120.

During interval 326, RFID tag 120 talks to RFID reader 110 as follows. According to block 356, RFID reader 110 transmits a Continuous Wave (CW), which can be thought of as a carrier signal that ideally encodes no information. As discussed before, this carrier signal serves both to be harvested by RFID tag 120 for its own internal power needs, and also as a wave that RFID tag 120 can backscatter. Indeed, during interval 326, according to block 366, RFID tag 120 does not receive a signal for processing. Instead, according to block 376, RFID tag 120 modulates the CW emitted according to block 356, so as to generate backscatter wave 126. Concurrently, according to block 386, RFID reader 110 receives backscatter wave 126 and processes it.

An order, a timing, and other parameters of RFID communications may be defined by industry and/or government standards. For example, the Class-1 Generation-2 UHF RFID Protocol for Communications at 860 MHz-960 MHz ("Gen2 Specification") by EPCglobal, Inc. is one such standard. The contents of the Gen2 Specification version 1.2.0 are hereby incorporated by reference.

Figure 4:
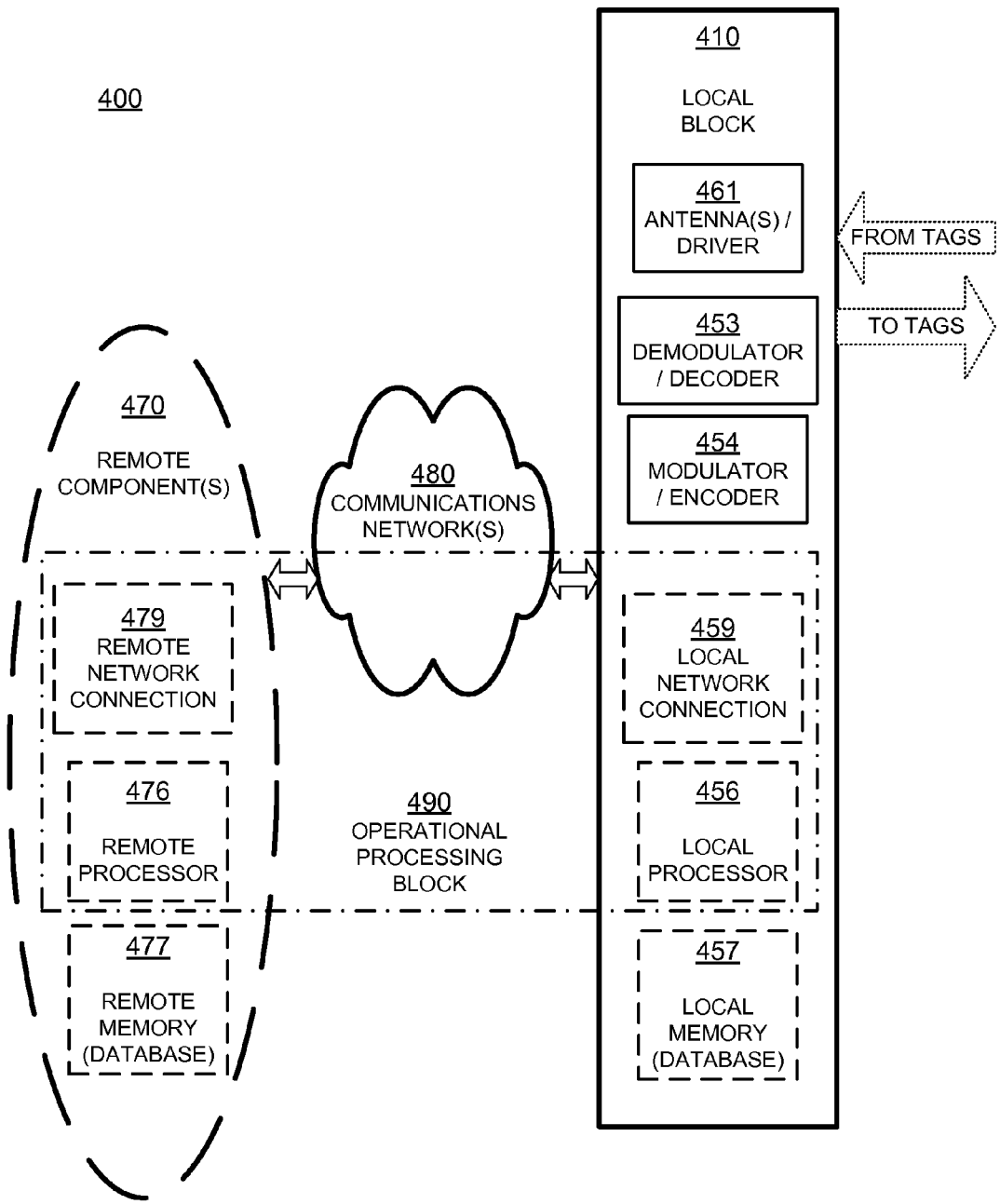
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in a single chip with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an authentication function, similar to local processor 456.

Remote component(s) 470 can also include a remote memory 477. Remote memory 477 can be made in any way known in the art, such as was described with reference to local memory 457. Remote memory 477 may include a local database, and a remote database of a Standards Organization, such as one that can reference EPCs. Remote memory 477 may also contain information associated with command, tag profiles, keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
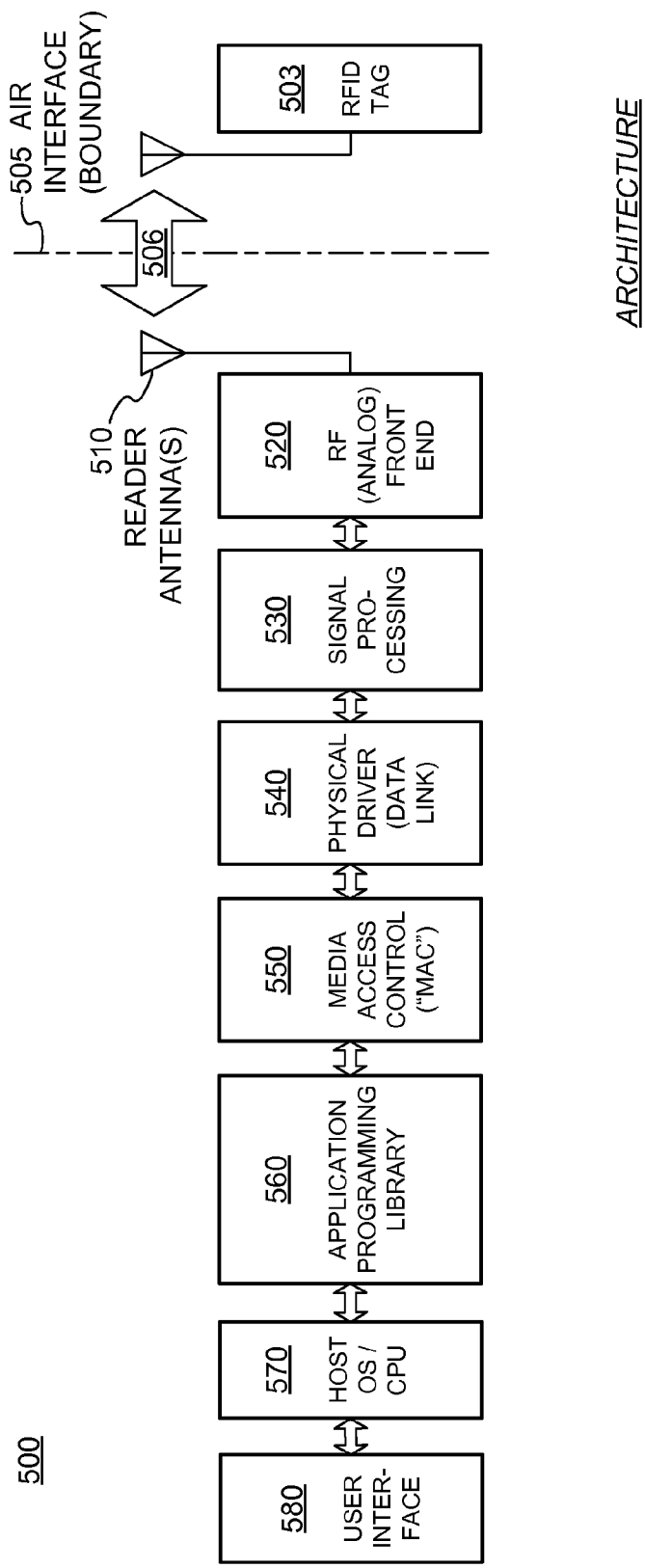
FIG. 5 is a block diagram illustrating an overall architecture of an RFID system according to embodiments.

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself RFID tag 503 conducts a wireless communication 506 with the remainder, via the air interface 505. It is noteworthy that air interface 505 is really only a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550, which is also known as MAC layer module. In one embodiment, MAC layer module 550 exchanges packets of bits with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving data that may include a tag public key, an electronic signature, a tag identifier, an item identifier, and a signing-authority public key. In some embodiments the one or more processors may verify an electronic signature, create a tag challenge, and verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for transmitting RFID waveforms and in the other direction for receiving RFID waveforms. In transmitting mode, waveform initiation can be in any one of the modules. Ultimately, signals are routed to reader antenna(s) 510 to be transmitted as wireless waves. In receiving mode, reader antenna(s) 510 receives wireless waves, which are in turn processed successively by the various modules in the chain. Processing can terminate in any one of the modules.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to employing RFID readers for tag authentication using public-key cryptography. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments further include storage media. Such media, individually or in combination with others, have stored thereon instructions, data, keys, signatures, and other data of a program made according to embodiments. A storage medium according to embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6B:
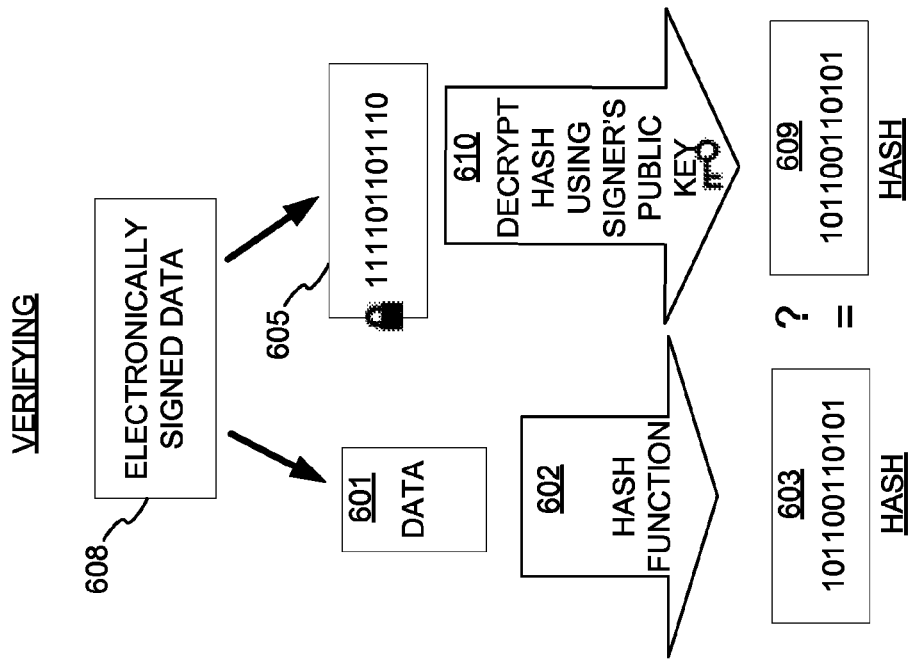
FIG. 6B is a flow diagram illustrating verifying electronically signed data.
Figure 6A:
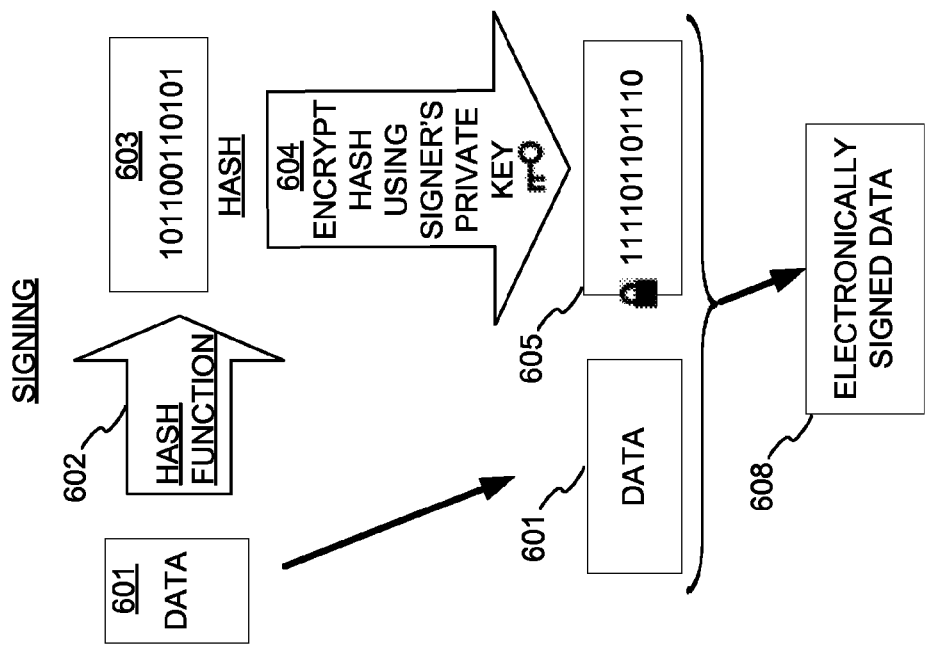
FIG. 6A is a flow diagram illustrating electronically signing data.

FIGS. 6A and 6B are flow diagrams illustrating signing and verifying an electronic signature (ES). Electronic signatures allow verification of the authenticity and integrity of an electronic message, including whether the message originated from a claimed sender and/or whether the message is original or has been altered. Electronic signatures often use digital bits or coding, in which case they may be termed digital signatures. In this disclosure the terms "electronic signature", "digital signature", and "ES" are used interchangeably.

Electronic signatures often employ asymmetric cryptography. A signatory, also referred to as a sender, possesses a private-public key pair where the private and public keys are mathematically related to each other. The sender uses the private key to generate the ES. A recipient uses the sender's public key to verify the ES. A verified ES provides the recipient with some confidence that the message was created by a known sender and that it was not altered in transit.

FIG. 6A is a flow diagram illustrating an asymmetric method for generating an ES. A hash value 603 is derived from data 601 and a hash function 602. The hash value 603 is encrypted using the signer's private key (604). The encrypted hash value is the ES 605. The ES 605 is attached to the data 601 to form electronically-signed data 608.

FIG. 6B is a flow diagram illustrating an asymmetric method for verifying an ES. The electronically signed data 608 is split into two components, data 601 and ES 605. The hash value 603 is derived from data 601 and hash function 602. The ES 605 is decrypted using the signer's public key 610 to form a decrypted hash value 609. The hash value 603 is compared with the decrypted hash value 609. If the hash value 603 is equal to the decrypted hash value 609 then the ES 605 is considered verified or proper. A verified ES provides assurance that the data 601 was signed by the known sender and that the data has not been altered.

An important attribute of digital/electronic signatures is that they are difficult to forge. A number of standards have been developed for digital signatures. The Digital Signature Standard (DSS) is a U.S. Government standard for digital signatures. DSS is specified in Federal Information Processing Standards (FIPS) 186-1 and FIPS186-3. FIPS186-1 specifies two digital signature algorithms, the Digital Signature Algorithm (DSA) and the RSA digital signature algorithm. FIPS186-3 includes a third digital signature algorithm, the Elliptic Curve Digital Signature Algorithm (ECDSA). FIPS180-3, the Secure Hash Standard (SHS), specifies the hash functions to be used in conjunction with FIPS186-1 and FIPS186-3. The DSS, FIPS 186-1, FIPS186-3, and FIPS180-3 are hereby incorporated by reference in their entireties.

Figure 7:
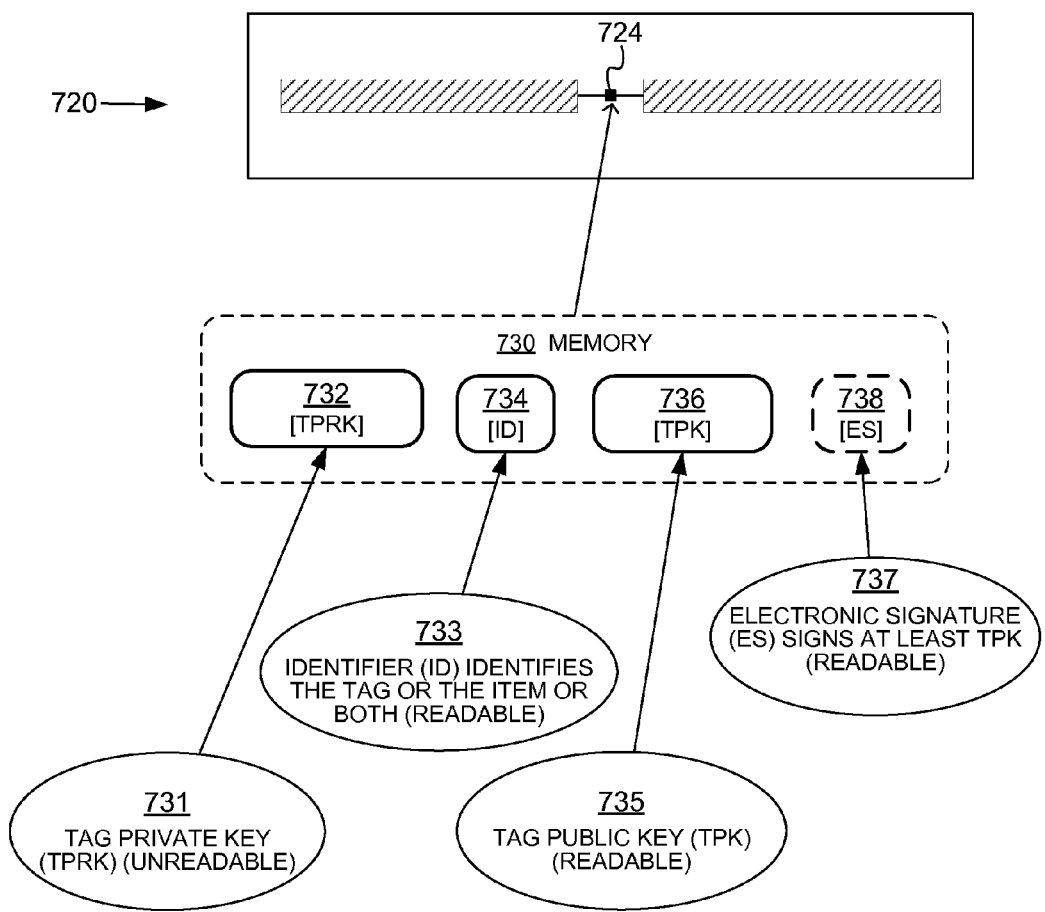
FIG. 7 illustrates a tag private key, an identifier, a tag public key, and an electronic signature stored in an RFID tag according to embodiments.

FIG. 7 illustrates how a tag private key, an identifier, a tag public key, and an electronic signature may be stored in an RFID tag according to embodiments.

Tag memory 730, which is part of tag IC 724 of a tag 720, shown in diagram 700, may store a variety of data. Some of the data relevant to this disclosure may include a tag private key (TPRK) 732, an identifier (ID) 734, a tag public key (TPK) 736, and an electronic signature (ES) 738.

A tag manufacturer or other legitimate entity may generate the tag private-public (TPRK-TPK) key pair. The tag keeps its TPRK secret. The tag uses the TPRK when responding to reader challenges. A signing authority, which holds a master private-public key pair, generates a tag-specific ES 738 based on at least the signing authority's master private key and the TPK 736. The tag does not normally keep either the TPK or the ES secret. The ES signs at least the TPK, and may sign the ID 734 and/or other tag information as well.

As shown in FIG. 7, the tag stores its TPRK 732 in memory portion 731 which is typically unreadable by a reader. The tag stores its ID 734, which identifies the tag and/or an item to which the tag is attached, in memory portion 733 which is typically readable by a reader. This ID may be a tag identifier (TID), item identifier like an EPC code (EPC) or a unique item identifier (UII), or other number like a serialized global trade identification number (SGTIN) according to some standardized protocols. The tag stores its TPK 736 in memory portion 735 which is typically readable by a reader. The tag stores its ES 738 in memory portion 737 which is also typically readable by a reader.

Counterfeiters can clone tags that do not have a hidden key or other hidden secret by simply copying the tag memory contents. Counterfeiters cannot easily clone tags built according to embodiments because the tags contain an unreadable TPRK and use challenge-response methods for authentication.

Embodiments also provide a means for a reader to authenticate a tag without needing to know a unique password or key for each tag. The tag exposes its TPK, protected by an ES, to the reader. The reader uses the signing authority's master public key and the ES to verify the TPK. The reader then uses the verified TPK and a challenge-response dialog to authenticate the tag, as described below.

Embodiments can be used for items and applications requiring counterfeit detection, where genuine items have authentic tags but non-genuine items do not have authentic tags and can be discovered, traced, and removed. Embodiments render counterfeiting or cloning a tag difficult by providing each authentic tag with a (ideally) unique private-public key pair and allowing a reader to verify the tag's authenticity without needing to store a unique public key for every tag and without needing to access a network every time it wants to verify a tag. Example applications include retail, food safety, pharmaceutical, document protection, and the currency industries.

Figure 8:
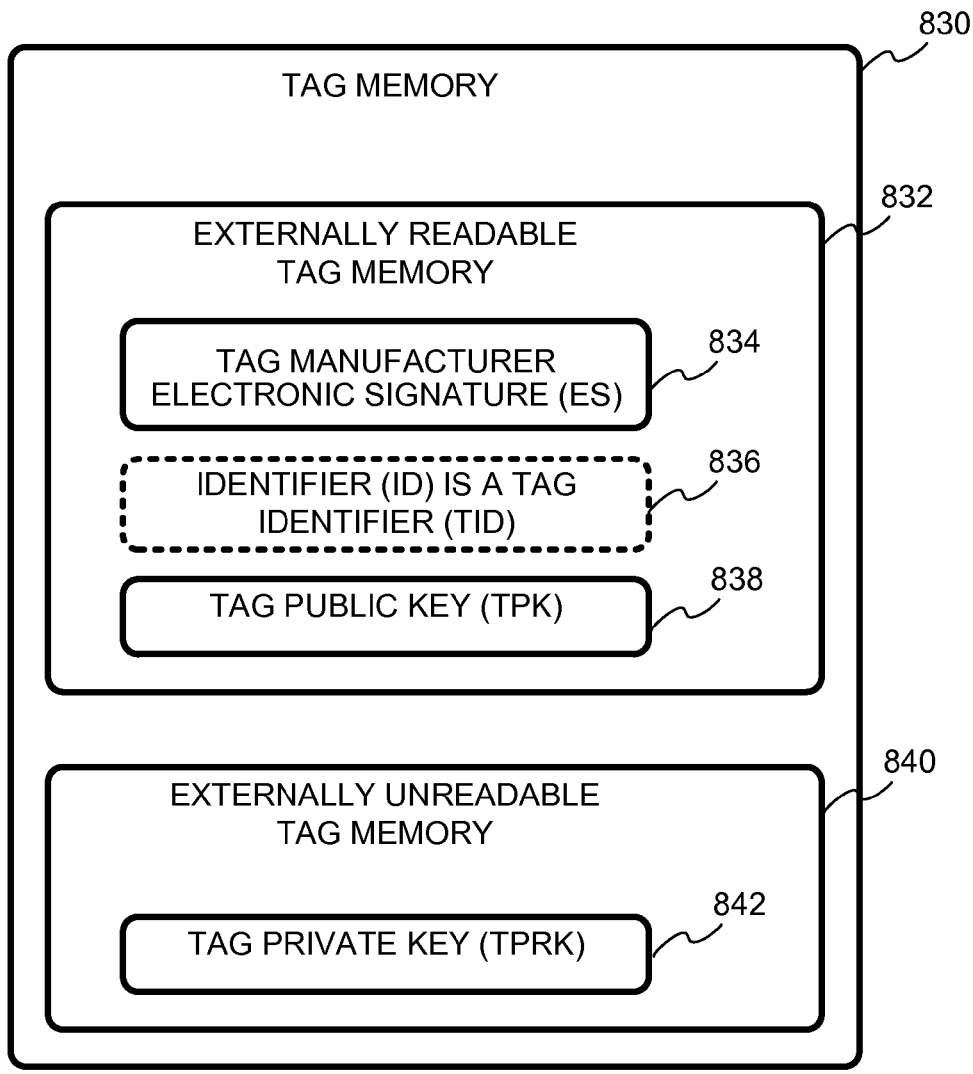
FIG. 8 illustrates a tag memory configuration according to one embodiment, where the identifier is a tag identifier and the tag manufacturer is the signing authority for the electronic signature.

FIG. 8 illustrates a tag memory configuration according to one embodiment, where the ID is a tag identifier and the signing authority is the tag manufacturer.

Tag memory 830 in diagram 800 shows two distinct portions, labeled as to whether they are readable or unreadable by a device external to the tag, such as a reader. Memory portion 832 is readable. Memory portion 840 is unreadable. In the example scenario of FIG. 8 the signing authority is the tag manufacturer. At some point in time, for example early in the tag's life, the tag manufacturer produced a private-public tag key pair (i.e. TPK 838 and TPRK 842) and then generated ES 834 by signing TPK 838 using the tag manufacturer's master private key. The tag manufacturer then wrote TPK 838, optional ID 836, and ES 834 into memory portion 832. The tag manufacturer also wrote TPRK 842 into memory portion 840.

In some embodiments a reader may be able to reconfigure the tag at some later point in the tag's life and store new TPK, optional ID, ES, and TPRK in the tag. In some embodiments the ES signs both the TPK and the ID. In other embodiments the tag may store a first ES for the TPK and a second ES for the ID. In yet other embodiments the memory portions 832 and 840 may each comprise multiple memory banks or multiple physical memory regions.

The TPK is verifiable using the tag manufacturer's master public key, which in some embodiments is freely available, and the ES. In some embodiments this master public key may only be available to authenticated readers. In some embodiments TPK 838, ID 836, and/or ES 834 may be encrypted.

Figure 9:
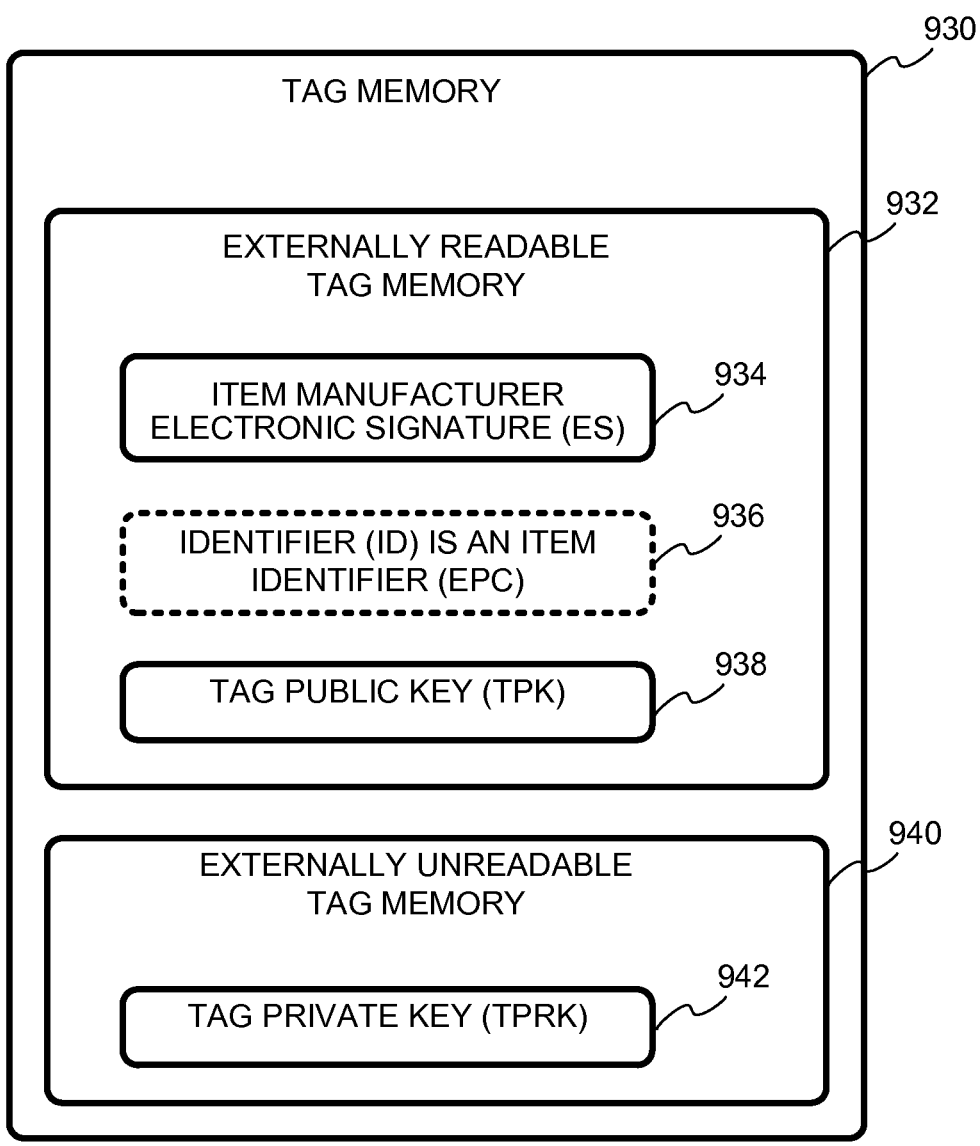
FIG. 9 illustrates a tag memory configuration according to another embodiment, where the identifier is an item identifier and the item manufacturer is the signing authority for the electronic signature.

FIG. 9 illustrates a tag memory configuration according to embodiments, where the ID is an item identifier and the signing authority is the item manufacturer.

Similar to tag memory 830 in FIG. 8, tag memory 930 in diagram 900 has two distinct portions, labeled as to whether they are readable or unreadable by a device external to the tag, such as a reader. Memory portion 932 is readable. Memory portion 940 is unreadable. In the example scenario of FIG. 9 the signing authority is the item manufacturer. Similar to the embodiment of FIG. 8, at some point in time, for example early in the tag's life, the item manufacturer produced a private-public tag key pair (i.e. TPK 938 and TPRK 942) and then generated ES 934 by signing TPK 938 using the item manufacturer's master private key. The item manufacturer then wrote TPK 938, optional ID 936 (which may also be signed by the item manufacturer), and ES 934 into memory portion 932. The item manufacturer also wrote TPRK 942 into memory portion 940.

The TPK is verifiable using the item manufacturer's master public key, which in some embodiments is freely available, and the ES. In some embodiments this master public key may only be available to authenticated readers. In some embodiments TPK 938, ID 936, and/or ES 934 may be encrypted.

Figure 10:
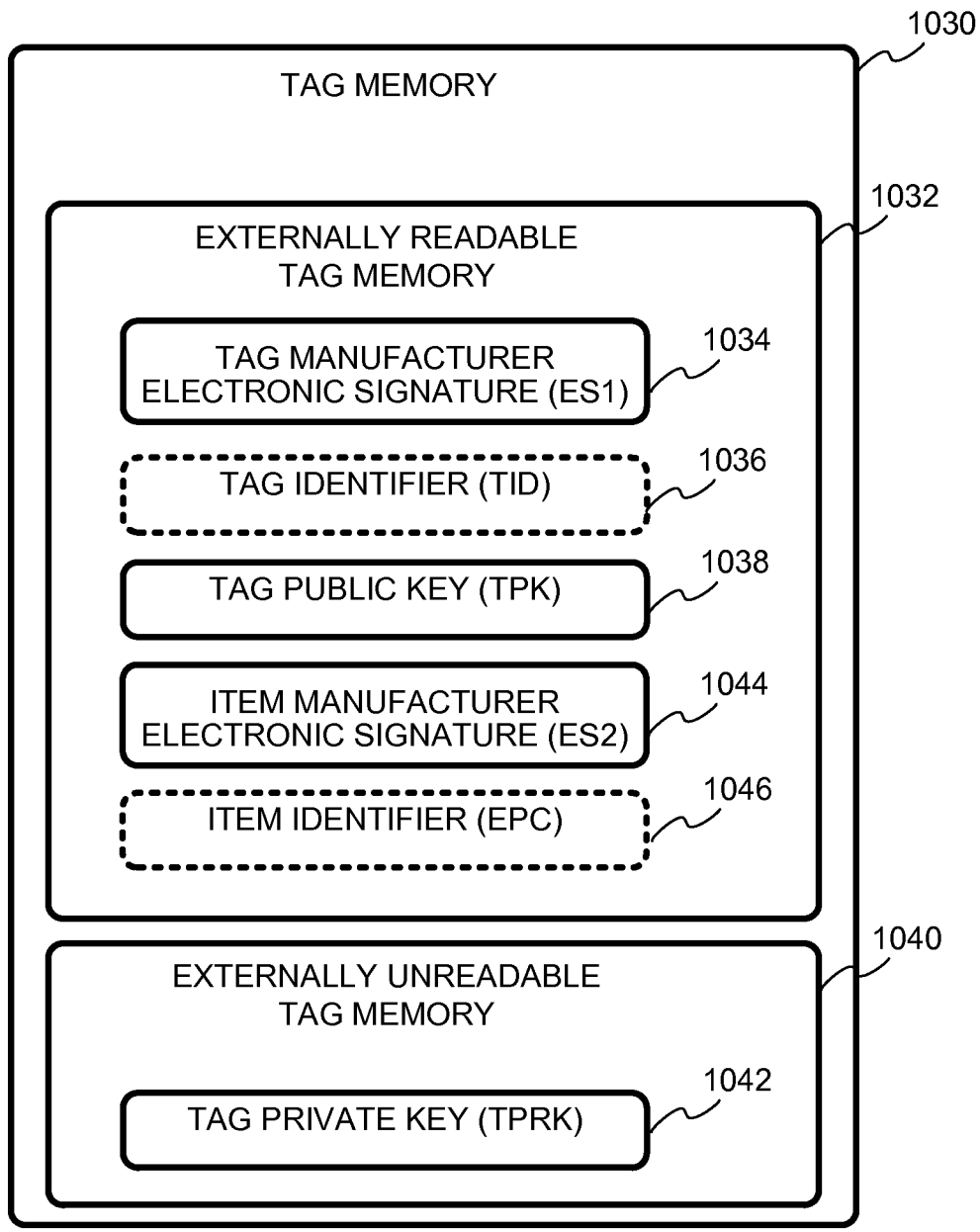
FIG. 10 illustrates a tag memory configuration according to yet another embodiment, where a first identifier is a tag identifier and a first signing authority is the tag manufacturer, and a second identifier is an item identifier and a second signing authority is the item manufacturer.

FIG. 10 illustrates a tag memory configuration according to embodiments, where two identifiers (a tag identifier and an item identifier) and two signing authorities (the tag manufacturer and the item manufacturer) are involved.

Similar to FIGS. 8 and 9, tag memory 1030 in diagram 1000 has two distinct portions, labeled as to whether they are readable or unreadable by a device external to the tag, such as a reader. Memory portion 1032 is readable. Memory portion 1040 is unreadable. In the example scenario of FIG. 10 the tag manufacturer is a first signing authority, and the item manufacturer is a second signing authority. At some point in time, for example early in the tag's life, the tag manufacturer produced a private-public tag key pair (i.e. TPK 1038 and TPRK 1042) and then generated ES1 1034 by signing TPK 1038 using the tag manufacturer's master private key. The tag manufacturer then wrote TPK 1038, optional TID 1036 (which may also be signed by the tag manufacturer), and ES1 1034 into memory portion 1032. The tag manufacturer also wrote TPRK 1042 into memory portion 1040 At some point in time the tag then passed to the item manufacturer, who generated ES2 1044 by signing TPK 1038 using the item manufacturer's master private key. The item manufacturer then wrote optional EPC 1046 (which may also be signed by the item manufacturer) and ES2 1044 into memory portion 1032. Of course, the order of the operations, and the entities that performed the writing, could be different. As one example, the item manufacturer could provide the EPC and the ES2 to the tag manufacturer, who then writes the TID, TPK, ES1, EPC, ES2, and TPRK to the memory.

The TPK is verifiable using the tag manufacturer's master public key, which in some embodiments is freely available, and ES1. The TPK is also verifiable using the item manufacturer's public key and ES2. A benefit of having two electronic signatures is that any particular reader may have access to the tag manufacturer's master public key, or to the item manufacturer's master public key, but not both. In this case the reader can still verify the TPK. Of course, ES2 could sign a combination of the EPC and the TPK, or could sign a combination of the ES1 and the TPK, or any other of the myriad possibilities, allowing multiple verification possibilities.

Figure 11:
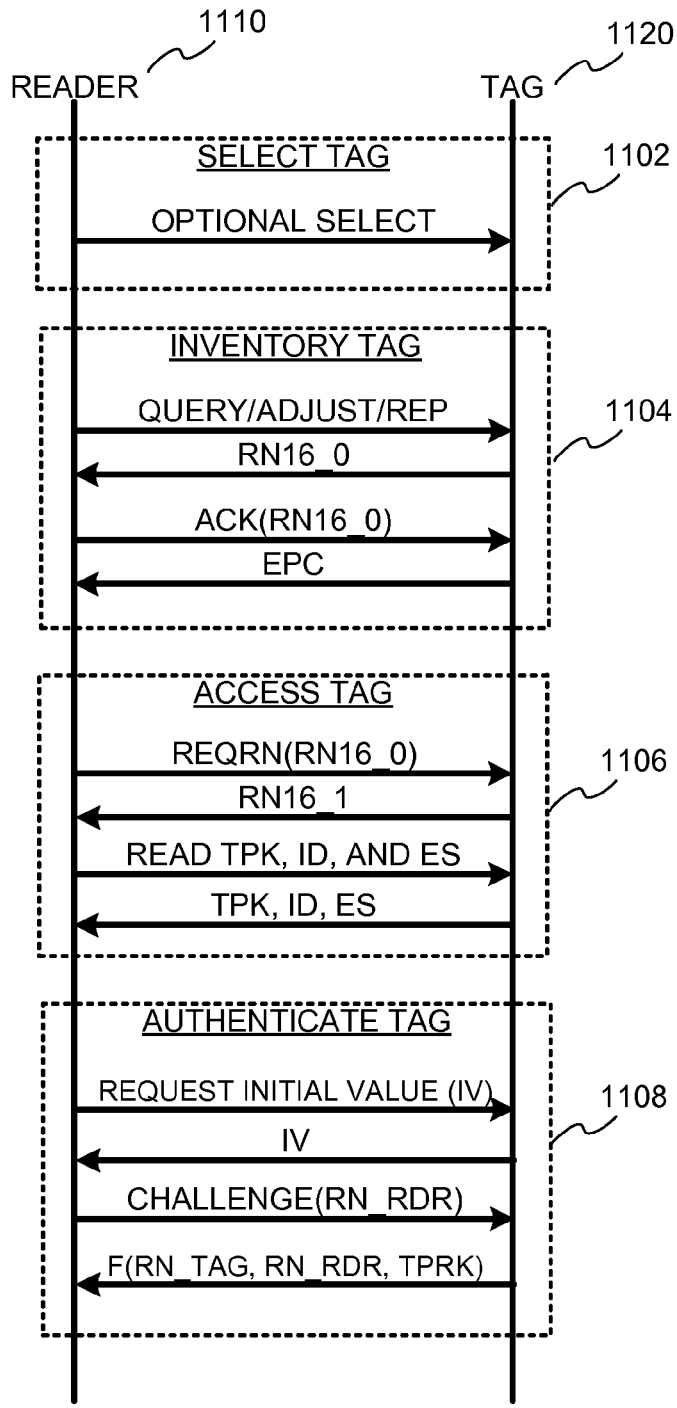
FIG. 11 illustrates exchanges between a reader and a tag according to embodiments.

FIG. 11 illustrates command-response exchanges between a reader and a tag according to embodiments. Although the commands and responses in diagram 1100 of FIG. 11 assume that the reader and tag are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 11. Other orderings are possible; exchanges can be merged, enhanced, or eliminated; and the authentication can be spread across various operations between reader and tag.

The interactions between reader 1110 and tag 1120 in diagram 1100 begin with an optional tag selection 1102, where the reader selects one or more tags from among a tag population for subsequent inventory and authentication. This optional selection is followed by an inventory 1104, where the reader singulates a tag and receives an identifier from the tag. The shown inventory uses the Query-ACK sequence described in the Gen2 Specification. Inventory is followed by access 1106, where the reader accesses the tag and reads the tag's TPK, optional ID, and ES. Finally, access is followed by authentication 1108, where the reader authenticates the tag using a challenge-response dialog as described herein.

As described above, embodiments include different orderings of interactions between reader and tag. For example, in some embodiments the reader may send a challenge during tag selection 1102, preceding the access 1106 where the reader reads the tag's TPK, and the tag may compute its response and store the response in memory for subsequent reading by a reader. The tag's computation may include a tag random number, and the tag may also store this random number for subsequent reading by the reader. Indeed, in embodiments where the challenge occurs during tag selection, and reading the response occurs during tag access, authentication 1108 need not exist, because its operations have been spread among select 1102 and access 1106. One reason a reader may choose to send the challenge with select 1102 is for multiple tags to hear the challenge and compute their cryptographic responses in parallel. Because cryptographic computations can be time intensive, enabling multiple tags to compute their responses in parallel allows more rapid authentication of a population of tags.

Authentication 1108 can include many options, depending on the chosen cryptographic algorithm. In the particular embodiment shown in FIG. 11, the reader first requests a tag random number from the tag. The tag generates a tag random number, calculates an initial value (IV) from the tag random number and the TPRK, and sends the IV to the reader. The reader then challenges the tag with a reader-generated random number. The tag computes its response based on the TPRK, the tag random number, and the reader challenge, and sends its response to the reader. At this point the reader can verify the tag's response using the IV, the reader random number, and the TPK. Of course, some challenge-response variants do not use an IV; others may include a command count or a message-authentication code; others may include the reader encrypting the random number in the reader challenge; and yet others may include fewer or more steps than shown.

According to embodiments a reader retrieves a tag's TPK and ES, obtains the signing authority's master public key via a network or other means, verifies the TPK, challenges the tag with a random number, receives the tag's response, and verifies the response using the TPK. In some embodiments the reader may also retrieve an ID from the tag, and may use the ID to indicate a signing authority or a particular master key. In some embodiments the challenge may include the reader encrypting a random number (RN) using the TPK, sending the encrypted RN to the tag, receive a decrypted RN from tag, and verifying by comparing the RN before encryption with the received, decrypted RN. In other embodiments the challenge may include the reader sending an RN to the tag, receiving an encrypted RN from tag, decrypting the received RN using the TPK, and verifying by comparing the sent RN with the decrypted, received RN.

Figure 12:
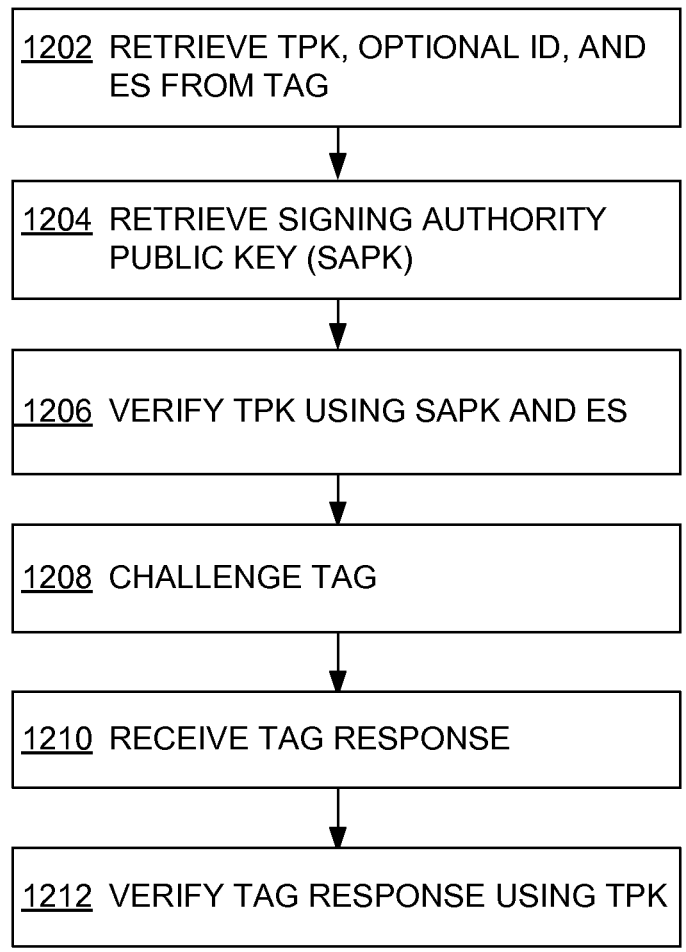
FIG. 12 is a flowchart illustrating a process for a reader authenticating a tag according to embodiments.

FIG. 12 is a flowchart illustrating a process for a reader authenticating a tag according to embodiments.

Process 1200 begins with operation 1202, where the reader retrieves at least a TPK and an ES from a tag. Optionally, the reader may also retrieve an ID which may be a tag identifier, an item identifier, or both. At operation 1204 the reader retrieves a signing-authority public key (SAPK), also known as a master public key, from a signing authority. In some embodiments the reader may use the ID to help identify the proper signing authority, or may use the ID to help identify which SAPK to use from a given signing authority. In some embodiments the reader may retrieve the SAPK indirectly, via a $3^{rd}$ party. In some embodiments, the SAPK may be stored at the reader, and the reader may access the stored SAPK instead of having to retrieve it from the signing authority. At operation 1206 the reader verifies the TPK using the SAPK and ES. At operation 1208 the reader challenges the tag. According to some embodiments the reader challenge may include a random number. At operation 1210 the reader receives a tag response to the challenge. At operation 1212 the reader verifies the tag response using the TPK. If the verification is successful then the tag is presumed genuine.

Figure 13:
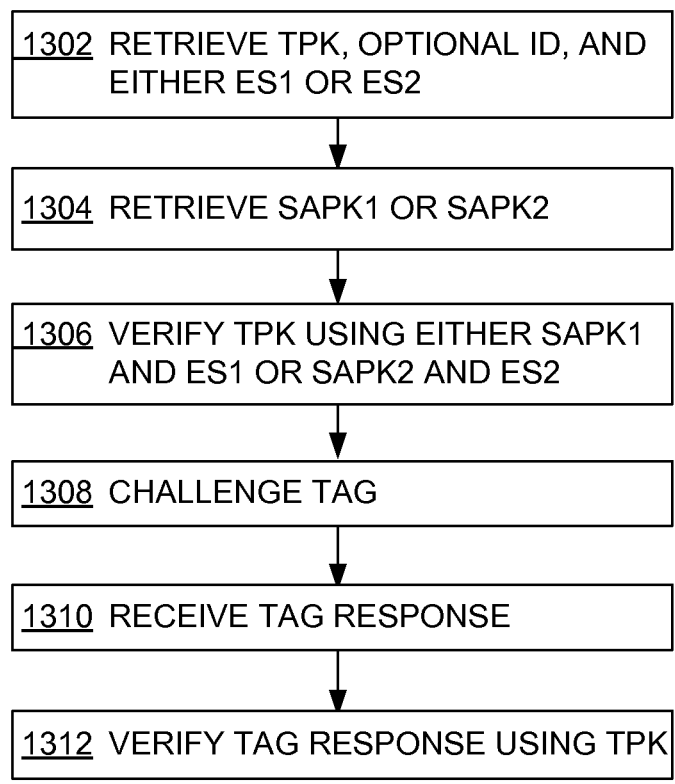
FIG. 13 is a flowchart illustrating a process for a reader authenticating a tag according to other embodiments.

FIG. 13 is a flowchart illustrating a process for a reader authenticating a tag according to embodiments.

Process 1300 begins with operation 1302, where the reader retrieves at least a TPK and an ES from a tag. In the embodiment shown the tag contains an ES1 and an ES2, corresponding to signing authority 1 and signing authority 2, and the reader retrieves one of ES1 and ES2. Optionally, the reader may retrieve both ES1 and ES2, and may also retrieve one or more of a tag identifier, item identifier, or another type of identifier. At operation 1304 the reader retrieves, from a signing authority, a SAPK that corresponds to the retrieved ES. In some embodiments the reader may use the ID to help identify the proper signing authority, or may use the ID to help identify which SAPK to use from a given signing authority. In operation 1306 the reader verifies the TPK using the SAPK and the ES. At operation 1308 the reader challenges the tag. At operation 1310 the reader receives a tag response to the challenge. At operation 1312 the reader verifies the tag response using the TPK. If the verification is successful then the tag is presumed genuine.

The operations described in processes 1200 and 1300 are for illustrative purposes only. An RFID tag-authentication process using public-key cryptography may be implemented using additional or fewer operations and in different orders using the principles described herein.

Figure 14:
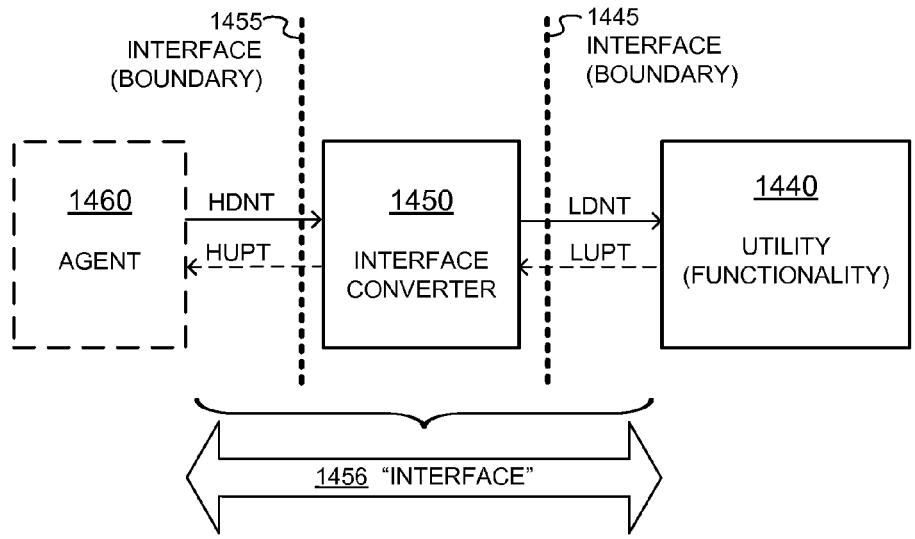
FIG. 14 is a block diagram illustrating an interface-converter architecture according to embodiments.

FIG. 14 is a block diagram illustrating an architecture 1400 for an interface converter according to embodiments. Architecture 1400 includes a utility 1440, which is a mechanism for performing some or all of the reader features described above.

More particularly, utility 1440 may cause a tag to store one or more received instructions in its memory, execute the instructions in response to a subsequent command or trigger event, and respond differently to a reader command based on results generated by executing the instructions.

Architecture 1400 additionally includes an interface converter 1450 and an agent 1460. Embodiments also include methods of operation of interface converter 1450. Interface converter 1450 enables agent 1460 to control utility 1440. Interface converter 1450 is so named because it performs a conversion, a change, as will be described in more detail below. Agent 1460, interface converter 1450, and utility 1440 can be implemented in any way known in the art. For example, each can be implemented in hardware, middleware, firmware, software, or any combination thereof. In some embodiments, agent 1460 is a human.

Between interface converter 1450, agent 1460 and utility 1440 there are respective boundaries 1455, 1445. Boundaries 1455, 1445 are properly called interfaces, in that they are pure boundaries, as is the above described air interface.

In addition, it is a sometimes informal usage to call the space between boundaries 1455 and 1445, which includes interface converter 1450, an "interface" 1456. Further, it is common to designate this space with a double arrow as shown, with an understanding that operations take place within the arrow. So, although "interface" 1456 is located at a boundary between agent 1460 and utility 1440, it is not itself a pure boundary. Regardless, the usage of "interface" 1456 is so common for interface converter 1450 that this document sometimes also refers to it as an interface. It is clear that embodiments of such an "interface" 1456 can be included in this invention, if they include an interface converter that converts or alters one type of transmission or data to another, as will be seen below.

Agent 1460 can be one or more layers in an architecture. For example, agent 1460 can be something that a programmer programs to. In alternative embodiments, where agent 1460 is a human, interface converter 1450 can include a screen, a keyboard, etc. An example is now described.

Figure 15:
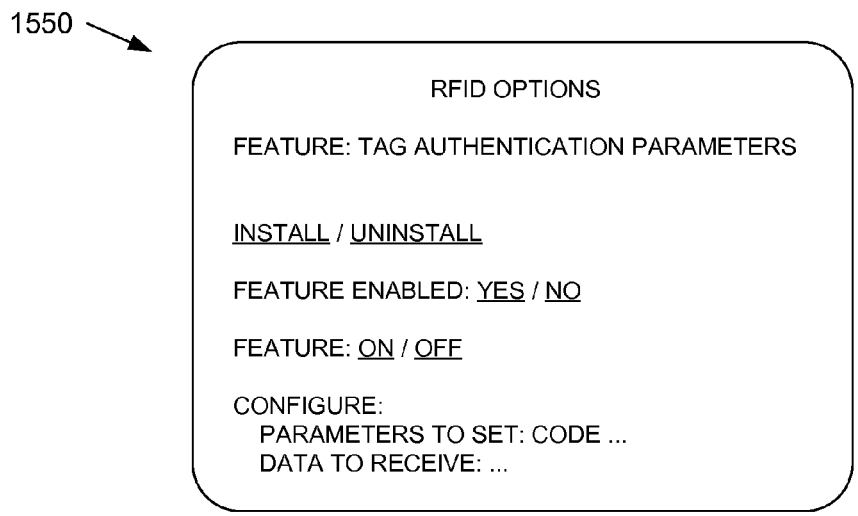
FIG. 15 is a sample screenshot of an interface converter such as the interface converter of FIG. 14, according to an embodiment.

FIG. 15 is a sample screenshot 1550 of an interface converter, such as the interface converter of FIG. 14. Screenshot 1550 can be that of a computer screen for a human agent, according to an embodiment. What is displayed in screenshot 1550 exposes the functionality of a utility, such as utility 1440. Inputs by the user via a keyboard, a mouse, etc., can ultimately control utility 1440. Accordingly, such inputs are received in the context of screenshot 1550. These inputs are determined from what is needed for controlling and operating utility 1440. An advantage with such interfacing is that agent 1460 can prepare RFID applications at a higher level, without needing to know how to control lower level RFID operations. Such lower level RFID operations can be as described in the Gen2 Specification, in cryptographic algorithms, in other lower level protocols, etc. Utility 1440 can be controlled in any number of ways. Some such ways are now described.

Returning to FIG. 14, one way interface converter 1450 can be implemented is as a software Application Programming Interface (API). This API can control or provide inputs to an underlying software library, and so on.

Communications can be made between agent 1460, interface converter 1450, and utility 1440. Such communications can be as input or can be converted, using appropriate protocols, etc. What is communicated can encode commands, data, etc. Such communications can include any one or a combination of the following: a high-down communication HDNT from agent 1460 to interface converter 1450; a low-down communication LDNT from interface converter 1450 to utility 1440; a low-up communication LUPT from utility 1440 to interface converter 1450; and a high-up communication HUPT from interface converter 1450 to agent 1460. These communications can be spontaneous, or in response to another communication, or in response to an input or an interrupt, etc.

Commands are more usually included in communications HDNT and LDNT, for ultimately controlling utility 1440. Controlling can be in a number of manners. One such manner can be to install utility 1440, or just a feature of it. Such installing can be by spawning, downloading, etc. Other such manners can be to configure, enable, disable, or operate utility 1440, or just a feature of it. These commands can be standalone, or can carry parameters, such as data, instructions to be stored by tags, etc. In some embodiments interface converter 1450 can convert these commands to a format suitable for utility 1440.

Data is more usually included in communications HUPT and LUPT. The data can inform as to success or failure of executing an operation. The data can also include tag data, which can be both codes read from tags and data about reading tags (such as time stamps, date stamps, etc.). In some embodiments interface converter 1450 can convert the data to a format suitable for agent 1460, including in some cases aggregating, filtering, merging, or otherwise altering the format or utility of the data.

It should be noted that what passes across a single pure boundary is unchanged (by the mere definition of what is a pure boundary). But what passes through interface converter 1450 can be changed or not. More particularly, high-down communication HDNT can be being encoded similarly to, or differently from, low-down communication LDNT. In addition, low-up communication LUPT can be encoded similarly to, or differently from, high-up communication HUPT. When different, the difference can be attributed to interface converter 1450, which performs a suitable change, or conversion, of one communication to another. The change, or conversion, performed by interface converter 1450 is for exposing the functionality of utility 1440 to agent 1460, and vice versa. In some embodiments, a command is converted, but a parameter is passed along without being converted. Plus, what is not converted at one module may be converted at another. Such modules taken together can also form an interface converter according to embodiments.

Figure 16:
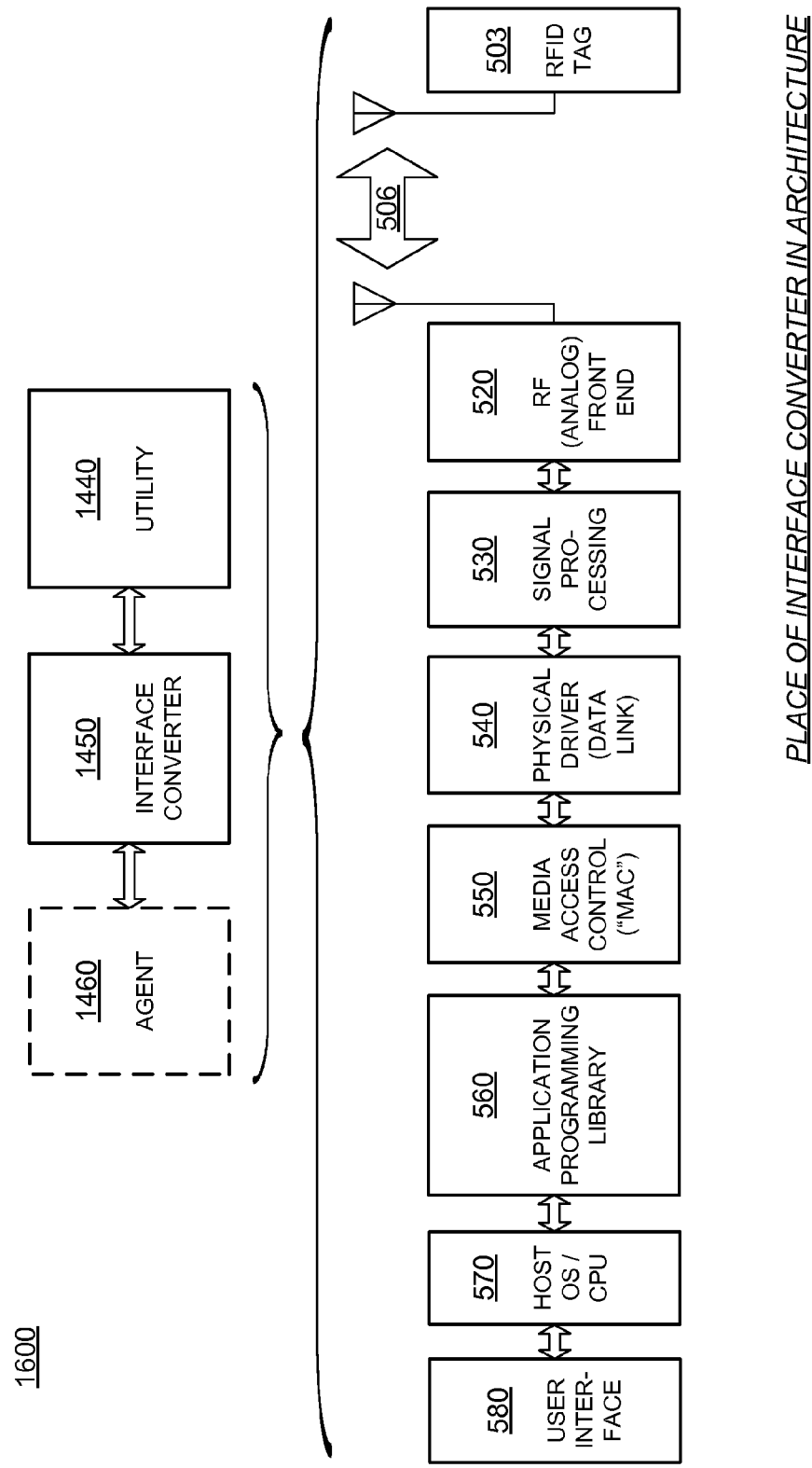
FIG. 16 is a diagram for showing a correspondence for how components of FIG. 14 can be implemented by those of FIG. 5, in embodiments where the interface converter is implemented by a reader.

Agent 1460, interface converter 1450, and utility 1440 can be implemented as part of a reader, or as a different device. For being implemented as part of a reader, FIG. 16 suggests a scheme 1600 where agent 1460, interface converter 1450, and utility 1440 can be implemented in connection with respective reader modules that are suitable, depending on the requirements.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) reader to authenticate an RFID tag, the method comprising:
    retrieving a tag public key (TPK), an item identifier (II), and an electronic signature (ES) from the tag, the ES computed over at least the TPK and the II;
    retrieving a signing-authority public key (SAPK) associated with the ES from a signing authority;
    verifying, using the SAPK and the ES, the TPK and the II;
    challenging the tag with a challenge;
    receiving a response from the tag; and
    authenticating the tag by verifying the response using the TPK.

2. The method of claim 1, wherein the II comprising one or more of: a tag identifier (TID), a unique item identifier (UII), an electronic product code (EPC), and a serialized trade identification number (SGTIN).

3. The method of claim 1, wherein the ES is generated from the TPK, the II, and a signing-authority private key (SAPRK) associated with the SAPK.

4. The method of claim 1, wherein the challenge includes a random number and verifying the response includes decrypting the response using the TPK.

5. The method of claim 1, wherein the challenge includes a random number encrypted using the TPK and verifying the response includes comparing the response with the random number.

6. The method of claim 1, further comprising receiving an initial value (IV) from the tag, the initial value generated by the tag from at least a tag random number and a tag private key (TPRK).

7. The method of claim 6, wherein the challenge includes a random number derived at least in part from the IV.

8. The method of claim 1, wherein the challenge is generated from at least a reader random number and a tag random number.

9. The method of claim 1, wherein the RFID tag stores a tag private key (TPRK) associated with the TPK.

10. The method of claim 9, further comprising:
    causing the tag to form its response from at least the challenge and the TPRK.

11. The method of claim 9, further comprising:
    causing the tag to form its response from at least the challenge, the TPRK, and a tag random number using a cryptographic algorithm.

12. The method of claim 9, wherein the TPK is stored in a readable memory of the tag and the TPRK is stored in an unreadable memory of the tag.

13. The method of claim 1, wherein challenging the tag precedes retrieving the TPK.

14. The method of claim 1, wherein receiving the response includes reading the response from a tag memory.

15. A Radio Frequency Identification (RFID) reader system for authenticating an RFID tag, the system comprising:
    an RFID reader configured to:
        retrieve a tag public key (TPK), an item identifier (II), and an electronic signature (ES), the ES computed over at least the TPK and the II, from the tag;
        retrieve a signing-authority public key (SAPK) associated with the ES from a signing authority;
        verify, using the SAPK and the ES, the TPK and the II;
        challenge the tag with a challenge;
        receive a response from the tag; and
        authenticate the tag by verifying the response using the TPK.

16. The RFID reader system of claim 15, wherein the II comprises one or more of: a tag identifier (TID), a unique item identifier (UII), an electronic product code (EPC), and a serialized trade identification number (SGTIN).

17. The RFID reader system of claim 15, wherein the RFID reader is further configured to:
    cause the tag to generate a tag random number;
    receive at least one of the tag random number and a function of the tag random number from the tag; and
    verify the response using at least a reader random number, one of the tag random number and the function of the tag random number, and the TPK.

18. The RFID reader system of claim 15, wherein the challenge includes a random number and verifying the response includes decrypting the response using the TPK.

19. The RFID reader system of claim 15, wherein the challenge includes a random number encrypted using the TPK and verifying the response includes comparing the response with the random number.

20. The RFID reader system of claim 15, wherein the TPK is stored in a readable memory of the tag and a tag private key (TPRK) associated with the TPK is stored in an unreadable memory of the tag.

21. The RFID reader system of claim 15, wherein challenging the tag precedes retrieving the TPK, and receiving the response includes reading the response from a tag memory.

22. A method for a Radio Frequency Identification (RFID) reader to authenticate an RFID tag, the method comprising:

retrieving a tag public key (TPK) and an item identifier (II) from the tag;
retrieving at least one of a first electronic signature (ES1) and a second electronic signature (ES2) from the tag, the ES1 and the ES2 computed over at least the TPK and the II;
retrieving at least one of a first signing-authority public key (SAPK1) associated with the ES1 from a first signing authority and a second signing-authority public key (SAPK2) associated with the ES2 from a second signing authority;
verifying the TPK and the II using at least one of:
   the SAPK1 and ES1, and
   the SAPK2 and ES2;
challenging the tag with a challenge;
receiving a response from the tag; and
authenticating the tag by verifying the response using the TPK.

23. The method of claim 22, wherein the II comprises one or more of: a tag identifier (TID), a unique item identifier (UII), an electronic product code (EPC), and a serialized trade identification number (SGTIN).

24. The method of claim 22, wherein the ES1 is generated from the TPK, the II, and a first signing-authority private key (SAPRK1) associated with the SAPK1.

25. The method of claim 22, wherein the challenge includes a random number and verifying the response includes decrypting the response using the TPK.

26. The method of claim 22, wherein the challenge includes a random number encrypted using the TPK and verifying the response includes comparing the response with the random number.

27. The method of claim 22, wherein the first signing authority and the second signing authority are the same entity.

* * * * *